(12) United States Patent
Munch

(10) Patent No.: US 6,488,250 B1
(45) Date of Patent: Dec. 3, 2002

(54) SEAT GUIDE FOR MOUNTING A LONGITUDINALLY ADJUSTABLE CAR SEAT

(75) Inventor: Ingo Munch, Wuppertal (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/486,836

(22) PCT Filed: Aug. 4, 1998

(86) PCT No.: PCT/EP98/04835

§ 371 (c)(1),
(2), (4) Date: May 11, 2000

(87) PCT Pub. No.: WO99/11486

PCT Pub. Date: Mar. 11, 1999

(30) Foreign Application Priority Data

Sep. 3, 1997 (DE) .......................................... 197 38 383

(51) Int. Cl.⁷ .......................... F16M 13/00; B60N 2/02; B60N 2/42
(52) U.S. Cl. ............... 248/430; 297/216.1; 297/216.18; 297/344.1
(58) Field of Search ................................ 248/429, 430; 297/344.1, 216.1, 216.18

(56) References Cited

U.S. PATENT DOCUMENTS 4,760,988 A * 8/1988 Bianchi et al. ............. 248/430
5,350,148 A * 9/1994 Yamamura ............... 248/430 X

FOREIGN PATENT DOCUMENTS

| DE | 4333552 | 4/1995 |
| DE | 19519153 | 12/1995 |
| EP | 0090235 | 3/1983 |
| EP | 0114740 | 1/1984 |

* cited by examiner

Primary Examiner—Anthony D. Barfield
(74) Attorney, Agent, or Firm—Foley & Lardner

(57) ABSTRACT

A seat guide for mounting a car seat and to its positional adjustment in a direction of an axis of displacement. The seat guide has two guide rails installed parallel to the axis of displacement and support rollers which cooperate with and move relative to the guide rails to support a vertical load. Lateral guide devices are provided for lateral support in a direction of a lateral axis running essentially perpendicular to both the axis of displacement and the guide rails. The relative motion of the lateral guide devices cooperates with the guide rails overcoming any conditions of elastic rolling friction.

23 Claims, 4 Drawing Sheets

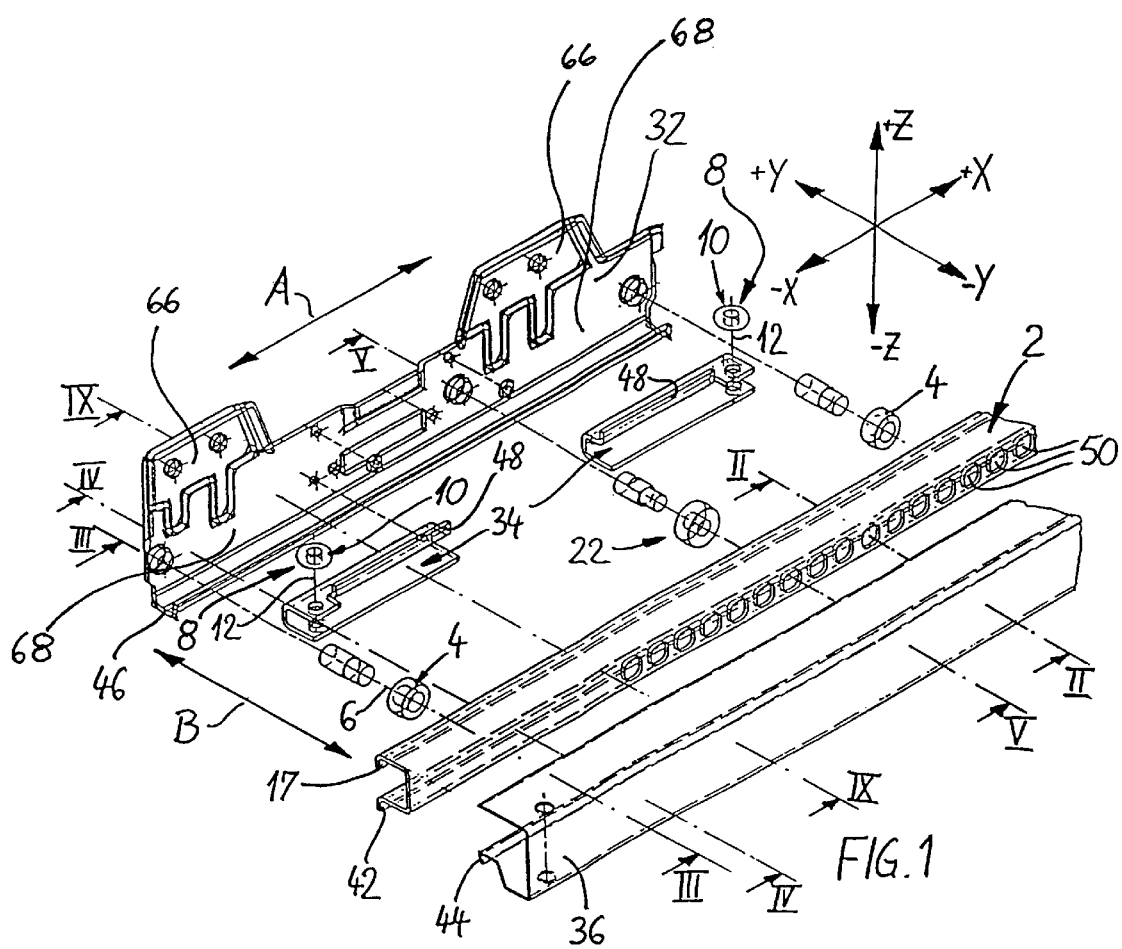
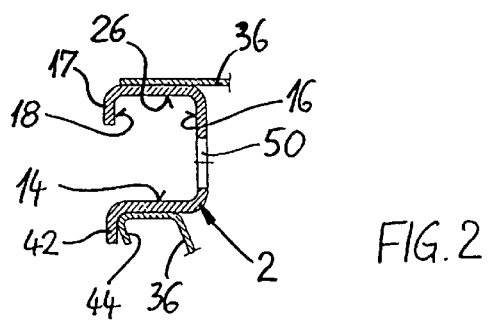
FIG. 1
FIG. 2

SEAT GUIDE FOR MOUNTING A LONGITUDINALLY ADJUSTABLE CAR SEAT

BACKGROUND OF THE INVENTION

1. Technical Field of the Invention

The present invention relates to a seat guide for mounting a car seat and for its positional adjustment in the direction of an axis of displacement, with two guide rails installed parallel to the axis of displacement, and with support rollers which, by rolling, cooperate with and move relative to the guide rails to support the vertical load.

2. Discussion

These kinds of seat guides have a special problem, in that large dimensional tolerances appear because of the large number of sheet metal parts used to manufacture the body, so that the clearance of the seat's guide components, measured in the direction of a vehicle's horizontal lateral axis (Y-axis), can even differ in the range of several millimeters. Furthermore, dimensional tolerances in the manufacture of the seat frame cannot be neglected. All of these tolerances have to be compensated so that the seat guide operates without trouble, i.e. to guarantee above all that there is no jamming when the position is adjusted. This problem is particularly important for bench seats above all, because their large width (span between the lateral guides) also makes them susceptible to rocking motion around a vertical axis (Z-axis), which can result in wedging of the bench seat.

A seat guide of the generic type is known from DE19547034A1. Here, two double-conical rollers (guide rolls) run on each of two guide rails and are guided axially movable in movable bearing arrangements on at least one side to compensate tolerances. This seat guide is basically very functional, but practice has shown that this design can only be realized at relatively high cost, because the bearings have to withstand certain forces, which can be quite high in a collision, above all. Special materials must therefore be used for the bearings. It has furthermore been shown, that no absolutely jam-free adjustment of the bench seat can be achieved in the longitudinal direction, even with this known design.

DE4330133A1 describes another rail guide for car seats, which is moreover designed as a slip-in guide with plastic slide blocks guided slidable in the guide rails. To compensate tolerances, support pieces are installed on the seat, which first of all have a bearing arrangement that can pivot around their longitudinal axis, and which secondly can slide in the direction of their longitudinal axis on at least one side of the seat. Externally, these support pieces feature plastic slide blocks, which slide in the longitudinal guide rails.

DE3920077A1 similarly deals with a car seat guided in rails, whereby the seat is guided on slide supports in the rails. Here, a fastening device, which is also supposed to compensate lateral play in the rails caused by structural tolerances, is provided to prevent rattling. This fastening device features a bolt, which is mounted in a fastening fastened to the seat and rests tightly against one of the rails under the force of a spring.

Finally, DE-OS11680269 describes a device for fastening a seat onto a floor. Here, we are dealing with a slip-in guide with interlocking rails, whereby it has one pair of rails whose rails interlock perpendicularly to the rails' longitudinal axis without any significant play, whereas the rails of all the remaining pairs can slide relative to each other transversely to the seat. Work tolerances are thereby supposed to be compensated by sliding the rails of the latter pairs transverse to the seat.

It is the objective of the present invention, to create a seat guide of the generic type, that guarantees steady operation without trouble during longitudinal adjustment, without jamming in particular, using inexpensive resources.

SUMMARY OF THE INVENTION

In accordance with the teachings of the present invention, a seat guide for positional adjustment of a vehicle seat along an axis of displacement is provided. The seat guide includes a first guide rail positioned parallel to the axis of displacement and a second guide rail spaced apart from the first guide rail along a lateral axis and positioned parallel to the axis of displacement. At least one support roller is operably associated with and moveable relative to the first guide rail and the second guide rail. Additionally, at least one lateral guide device is operably associated with and moveable relative to the first guide rail and the second guide rail with at least a portion of the at least one lateral guide device being moveable about an axis substantially perpendicular to the axis of displacement.

This is achieved in accordance with the invention, that in combination with the support rollers known by themselves, special lateral guide devices, cooperating with the guide rails by elastic rolling friction, are provided for lateral support in the direction of a lateral axis running essentially perpendicular to both the axis of displacement and the guide rails, especially guide rollers whose rolling and relative motion cooperates with the guide rails.

When the car seat is adjusted, the embodiment in accordance with the invention will only produce elastic rolling friction, because it deals with pure guide rollers. If the seat should tilt while its longitudinal position is being adjusted, i.e. tilting around its vertical axis, then at least one part of the lateral guide rollers will become arranged on at least one assigned guide surface of the respective guide rail, so that only very small rolling friction will also occur here, whereby catching or even wedging will be safely eliminated during seat adjustment.

One favorable embodiment of the invention allocates at least two guide rollers, separated in the direction of the axis of displacement, to each of the two guide rails. The clearance of each lateral pair's two guide rollers should be chosen as large as possible, depending on structural factors. The seat guide in accordance with the invention is thereby particularly suitable for wide bench seats, two-person or three-person bench seats for example. If there is any tipping, two guide rollers diagonally opposite each other will both become arranged on the two guide rails, so that jamming will be completely eliminated.

The seat guide in accordance with the invention can be realized with inexpensive resources, because conventional rolling bearings can be used as rollers.

The compensation of lateral dimensional tolerances can also be achieved without problem, because the rollers can be guided in the guide rails with a known permissible lateral play. Two minor lateral movements of the seat are indeed possible here, but these are favorably bounded by the guide rollers of the lateral guide devices, without a significant amount of extra friction occurring during adjustment.

In another favorable embodiment of the invention, compensating means are provided for relative support of the seat in a direction opposite to that in which the support rollers bear the load. In principle, slip-in guides can be used here, but it is particularly preferable if the compensating means on the side of each guide rail feature at least one compensating roller for resting and rolling on a supporting surface on the guide rails that is opposite the direction of load-bearing. It is the objective of these compensating means, to prevent rocking motion of the seat around its lateral axis or to minimize such motion, respectively.

To prevent any noise, especially rattling while driving, it is preferable to provide each provided roller with a raceway composed of an elastic material. This could possibly be dispensed with only for the support rollers, because these always abut the guide rails because of their weight.

If there are large stresses on the car seat, the provided rollers alone may not be capable of directing the working forces out of the seat, through the guide rails, and into the vehicle floor. To ensure that the car seat is securely supported in this case, a preferred embodiment of the invention provides special features to directly support the seat on stationary body components. These features can be built by providing the seat guide's components with web-like impact profile cutouts that interlock with playing distance, whereby these cutouts arrange against each other in the event large stresses occur.

BRIEF DESCRIPTION OF THE DRAWINGS

Further features and advantages of the invention will become apparent from the following discussion and accompanying drawings, in which:

FIG. 1 is a half of a seat guide in accordance with the invention, assigned to the side of a seat, in a perspective exploded view of its individual components;

FIG. 2 is an enlarged cross section through the region of the guide rail in the plane II—II of FIG. 1;

DETAILED DESCRIPTION OF THE PREFERRED EMBODIMENT

Figure 3:
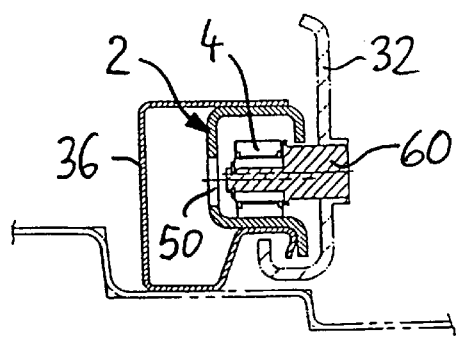
FIG. 3 is a cross section of the entire seat guide (with left and right guide parts) in the plane III—III of FIG. 1.
Figure 3:
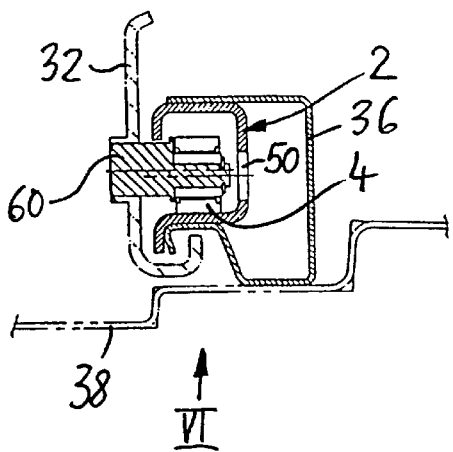

The following description of the preferred embodiment is merely exemplary in nature, and is in no way intended to limit the invention or its application or uses.

The same parts are always provided with the same labels in the drawing's various figures and will therefore generally only be described once.

As can first be deduced in FIG. 1, a seat guide in accordance with the invention is, first of all, for fastening an unillustrated car seat, especially a bench seat, within the vehicle, and secondly for linear adjustment of the seat as a unit, relative to its position in a direction of an axis of displacement A. FIG. 1 furthermore displays the three dimensional coordinate system with the axes X, Y, and Z, that is conventional in the automotive industry, where X represents the vehicle's horizontal longitudinal axis, Y the horizontal lateral axis, and Z the vertical axis. The axis of displacement A normally corresponds to the direction of the X-axis (seat's longitudinal displacement).

Figure 4:
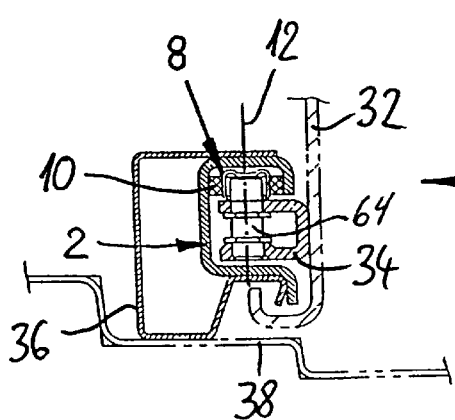
FIG. 4 is a cross section through the seat guide in the plane IV—IV of FIG. 1.
Figure 4:
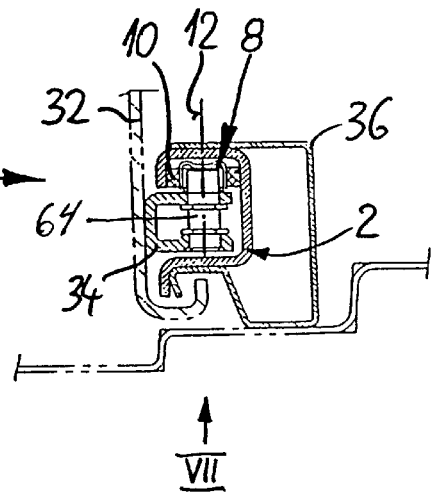
Figure 5:
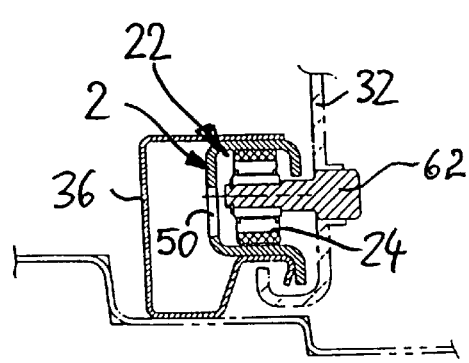
FIG. 5 is a corresponding cross section in the plane V—V of FIG. 1.
Figure 5:
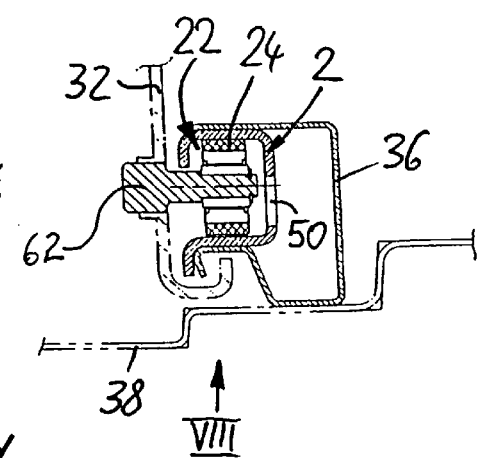
Figure 6:
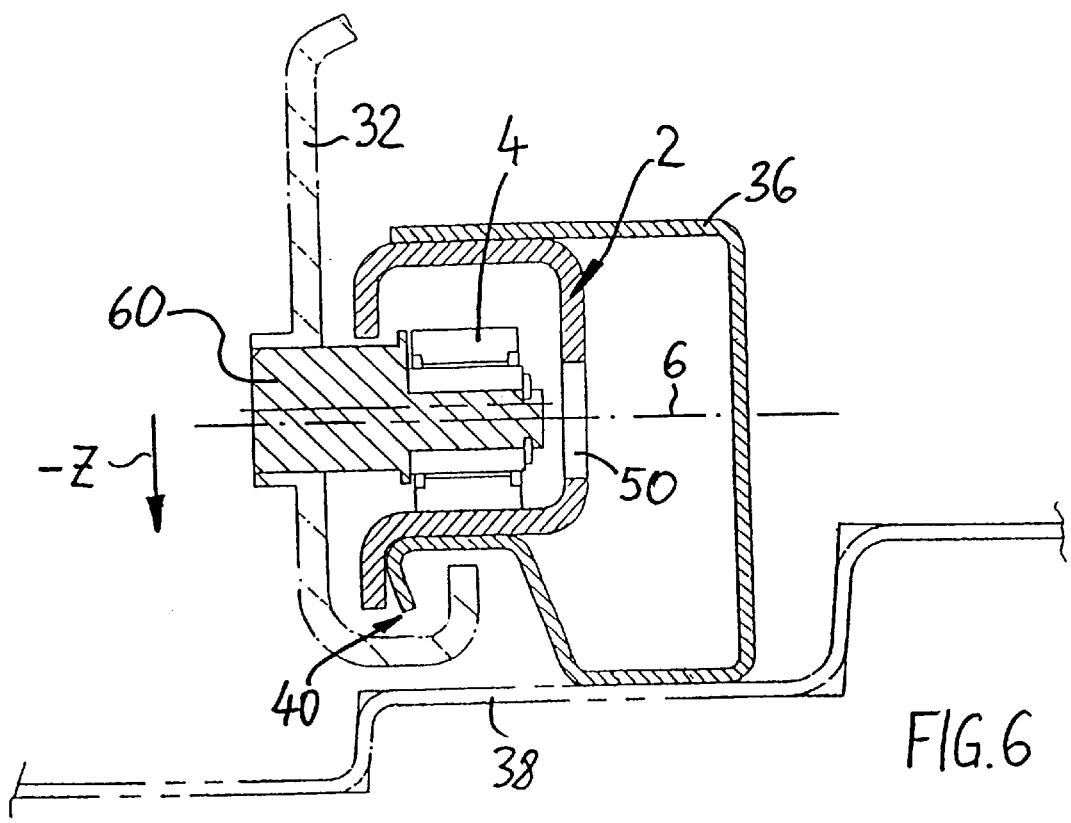
FIG. 6 is an enlarged crosssectional illustration of the seat guide half (guide part) labeled VI in FIG. 3.

In accordance with FIGS. 3 through 5, the seat guide features two mirror-symmetrical guide rails 2 arranged parallel to the axis of displacement A. Support rollers 4, which, by rolling, cooperate with and move relative to the guide rails 2, are provided for vertical load-bearing in the Z direction (See FIGS. 1, 3, and 6). Moreover (at least) two support rollers 4, separated in the direction of the axis of displacement A, are assigned to each of the two guide rails 2 and are mounted to rotate around rotational axes 6 that are perpendicular to the axis of displacement A, i.e. to parallel the Y-axis. The car seat is therefore resting on (at least) four support rollers 4.

Figure 7:
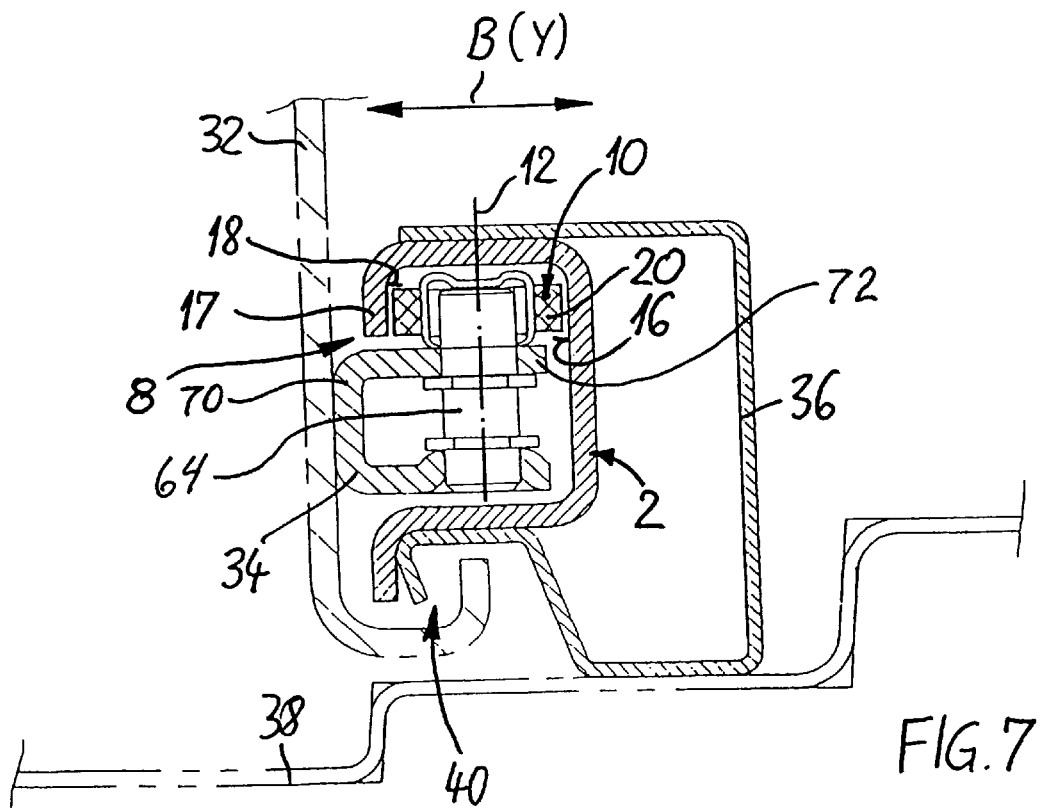
FIG. 7 is an enlarged illustration of the seat guide half labeled VII in FIG. 4.

As can be determined from FIGS. 1, 4, and 7, lateral guide devices 8 are provided in accordance with the invention for lateral support in the direction of a lateral axis B (which as a rule corresponds to the vehicle's lateral axis Y), running essentially perpendicular to both the axis of displacement A and the guide rails 2. These lateral guide devices 8 in accordance with the invention feature guide rollers 10, which cooperate with and move relative to the guide rails 2 and roll. Moreover, (at least) two guide rollers 10, separated from each other in the direction of the axis of displacement A, are appropriately assigned to each of the two guide rails 2 (See FIG. 1, in particular). In accordance with FIGS. 4 and 7, each guide roller 10 is mounted so that it can rotate around a rotational axis 12 approximately perpendicular to both the axis of displacement A and the lateral axis B (and consequently perpendicular to the direction of the Y-axis). The guide rollers 10 are preferably arranged shifted relative to the support rollers 4 in the direction opposite the load-bearing direction (upwards) (See FIGS. 3 and 4).

In accordance with FIG. 2, each guide rail 2 is designed as a rectangular profile, essentially C-shaped in cross section, whereby these rectangular profiles forming the guide rails 2 are designed open on the sides facing each other. Each guide rail 2 features an inside running tread 14 to support the support roller 4. For the guide roller 10 in accordance with the invention, each guide rail 2 features a first lateral guide surface 16 on its inside opposite the open side, and, preferably opposite it, a second lateral guide surface 18 formed by a bar section 17 bent on the open side. As is best seen in FIG. 7, each of the guide rollers 10 is guided in the guide rails 2 with a lateral playing distance between the guide surfaces 16 and 18, so that each can become arranged on only one of the two guide surfaces 16 or 18 when the seat is adjusted.

As illustrated, the guide rollers 10 are designed as rollers, especially conventional rolling bearings, each with a raceway 20, whereby the raceway is preferably made of an elastic material, such as plastic. Rattling caused by play can thereby be efficiently eliminated or reduced, respectively. The guide rollers 10 can each feature a slightly ball-shaped (convex) bearing face corresponding to the illustration in FIG. 1.

In the illustrated preferred example of the invention, the guide rails 2 are provided for stationary attachment to the vehicle, whereas the support rollers 4 and the guide rollers 10 can be fastened to the seat. This means that the "bottom" of the support rollers 4 will rest on the running tread 14.

Figure 8:
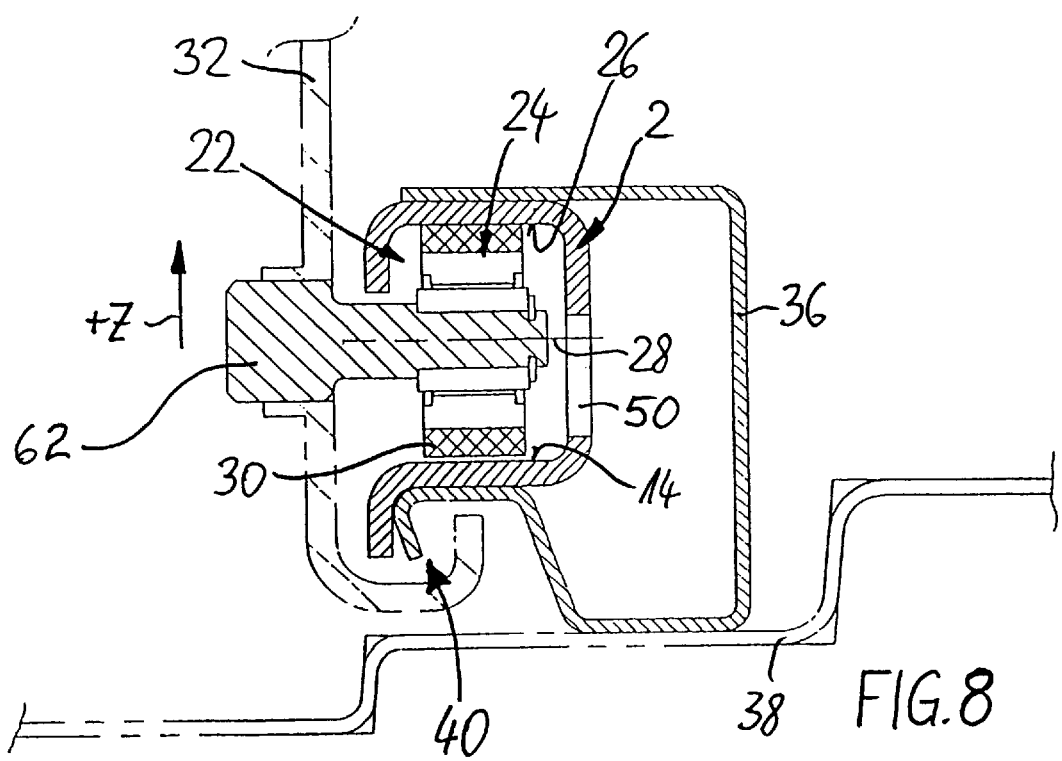
FIG. 8 is an enlarged illustration of the view VIII from FIG. 5.

As can now be determined from FIGS. 1, 5, and 8, additional compensating means 22, for relative support of the seat in a direction opposite the direction of load-bearing, are preferably provided. In the illustrated embodiment with guide rails installed stationary in the vehicle, the compensating means 22 rest vertically "upwards," i.e. in the +Z direction, within the guide rail 2. Preferably, (at least) one compensating roller 24, which abuts one of the supporting surfaces 26 of the respective guide rail 2 opposite the respective running tread 14 and rolls on it when the seat is adjusted, will be provided on the side of each guide rail 2 for this purpose. Moreover, there exists playing distance between each compensating roller 24 and the running tread 14, see FIG. 8 in particular. Each compensating roller 24 is mounted so that it can rotate around a rotational axis 28 that is approximately parallel to the lateral axis B, and also to the Y-axis. Appropriately, each compensating roller 24 is also designed as a roller, especially a roller bearing, with a raceway 30 preferably consisting of an elastic material.

As is now furthermore derived from FIG. 1, all rollers 4, 10, 24 are each attached to one of two support units 32, which can be fastened to the seat. These support units 32 are preferably designed as molded metal parts. The support rollers 4 and the preferably provided compensating rollers 24 are appropriately mounted directly on the respective support unit 32 by axle pins 60 and 62, as shown in FIGS. 3, 5, 6, and 8. The guide rollers 10 are each attached to a separate support piece 34, which is especially made of sheet metal and fastened to support unit 32. Each support piece 34 is basically designed U-shaped, whereby axle holes extend through two parallel sides of the U, and the guide rollers 10 are each mounted into these axle holes by axle pins 64 in accordance with FIGS. 4 and 7.

Preferably, every support unit 32 can be fastened to the seat in such a way that it can be elastically deformed locally to compensate lateral dimensional tolerances which appear between the guide rails 2. In the illustrated example, this is achieved in that each support unit 32 is only fastened in its top vertical region 66, so that it can be elastically deformed, together with the rollers, in the remaining bottom region 68 in the direction of the lateral axis B. In addition or alternatively, it can also be provided, that each support piece 34 is suitably fastened to its support element 32 in such a way, that it can be elastically deformed locally to compensate lateral dimensional tolerances between the guide rails 2. In the illustrated example, this is specially achieved, in that each support piece 34 is only fastened to the support unit 32 on the end 70 that lies opposite the respective roller 10. In this manner, the end 72 of the support piece 34 facing the roller 10 can move elastically relative to the support unit 32.

As far as the fastening of the guide rails is now concerned, each guide rail 2 is preferably fastened in a mounting rail 36, which can be mounted stationary on the vehicle. In accordance with FIGS. 3 through 9, the mounting rails 36 are only fastened onto a vehicle floor 38 (only drawn locally), specifically in the region of side rails (also called rocker panels), possibly also around the center tunnel. The mounting rails 36 feature an approximately C-shaped profile, whose open side is directed toward the vehicle's axis of central symmetry (perpendicular longitudinal plane $Y_0$, see FIGS. 3 through 5).

Figure 9:
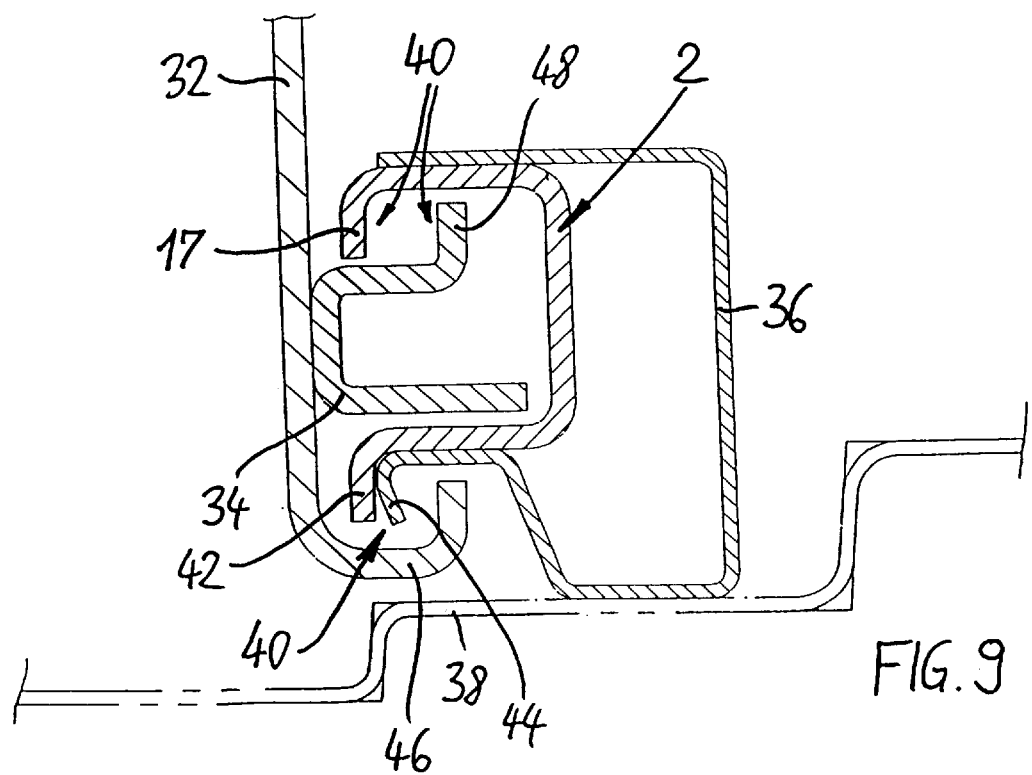
FIG. 9 is an enlarged cross section through the half of the seat guide in plane IX—IX of FIG. 1.

As can be seen from FIGS. 1, 2, and 9 above all, extra features 40 are preferably provided, to directly support the seat on stationary body components in case deformations occur in the region of the rollers 4, 10, 24. In the illustrated example, these features 40 deal with web-like profile cutouts, that interlock with playing distance and belong to support units 32 and/or support pieces 34 on the one hand, as well as to guide rails 2 and, if necessary, mounting rails 36 on the other hand. In accordance with FIG. 9, the guide rail 2, on its open side opposite the bar section 17, features a border ledge 42 which is bent facing away from the bar section 17. Preferably, the mounting rail 36 will also have a suitable border ledge 44 in this region. For this, the support unit 32 features a U-shaped edge 46, bent around 180°, which engages the border ledges 42, 44 above and below with playing distance. In addition, the support pieces 34 each feature a bent bar 48, which engages the bar section 17 of guide rail 2 that forms the second lateral guide surface 18 with playing distance. In this manner, profile cutouts are formed, which arrange together in the region of the rollers thereby supporting the seat on stationary body components if deformation occurs in this region.

Additionally, let is still be mentioned, that in accordance with FIG. 1, each guide rail 2 features latch holes 50, which are located distributed along at least part of its length, and which cooperate with an unillustrated locking device fastened on the respective support element 32, to arrest the car seat in its adjusted position. As illustrated, the latch holes 50 are located especially in the respective guide rail 2 on the wall that features the first lateral guide surface 16.

The invention is not restricted to the examples that have been illustrated and explained, but also includes all embodiments which work in a manner identical to the meaning of the invention. Furthermore, the foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A seat guide for positional adjustment of a vehicle seat in a direction of an axis of displacement and for attachment to the vehicle seat, said seat guide comprising:

two guide rails installable parallel to an axis of displacement and spaced apart along a lateral axis;

two support units attachable to the vehicle seat;

a plurality of support pieces attached to said two support units;

a plurality of support rollers in operable cooperation with and moveable relative to said guide rails, said plurality of support rollers being provided to support a vertical load, said plurality of support rollers being mounted on said two support units;

a plurality of lateral guide devices in operable cooperation with and moveable relative to said guide rails, said plurality of lateral guide devices being provided for lateral support in a direction along said lateral axis and operably positioned substantially perpendicular to said axis of displacement and said two guide rails, said plurality of lateral guide devices having a plurality of guide rollers in operable cooperation with and moveable relative to said guide rails, at least one of said plurality of guide rollers being attached to at least one of said plurality of support pieces, whereby one of said two support units and said plurality of support pieces is elastically deformable to compensate for lateral dimensional tolerances between said guide rails.

2. The seat guide as recited in claim 1, wherein at least two guide rollers are assigned to each of said two guide rails and separated in the direction of said axis of displacement.

3. The seat guide as recited in claim 2, wherein each guide roller is mounted so that it can rotate around a rotational axis approximately perpendicular to said axis of displacement and said lateral axis.

4. The seat guide as recited in claim 1, wherein said guide rails have a substantially rectangular profile, substantially C-shaped in cross section with at least a portion of each of said guide rails being open on sides facing the other of said guide rail.

5. The seat guide as recited in claim 4, wherein each guide rail includes a first lateral guide surface on a side opposite said open side arid a second lateral guide surface positioned adjacent said open side, said second lateral guide surface being formed by a bar section.

6. The seat guide as recited in claim 1, wherein each of said plurality of guide rollers are guided in said guide rails with a lateral playing distance.

7. The seat guide as recited in claim 6, wherein each of said plurality of guide rollers are rollers having a raceway made of an elastic material.

8. The seat guide as recited in claim 7, wherein each of said plurality of guide rollers have a slightly ball-shaped bearing face.

9. The seat guide as recited in claim 1, wherein said guide rails are provided for stationary attachment to the vehicle and said plurality of support rollers and said plurality of guide rollers can be fastened to the vehicle seat.

10. The seat guide as recited in claim 1, wherein each of said guide rails have an inside running tread upon which said plurality of support rollers are positioned.

11. The seat guide as recited in claim 1, wherein at least two of said plurality of support rollers are spaced apart in the direction of said axis of displacement and assigned to each of said two guide rails and are operable to rotate around rotational axes perpendicular to said axis of displacement.

12. The seat guide as recited in claim 1, further comprising a compensating means operable to provide support of the seat relative to said support rollers.

13. The seat guide as recited in claim 12, wherein said compensating means includes at least one compensating roller operatively associated with a supporting surface of said guide rails, said supporting surface of said guide rails being positioned opposite a running tread of said guide rails.

14. The seat guide as recited in claim 13, wherein said at least one compensating roller is mountable for rotation about a rotational axis substantially parallel to said lateral axis.

15. The seat guide as recited in claim 14, wherein said at least one compensating roller is designed as a roller having an elastic material raceway.

16. The seat guide as recited in claim 15, wherein said at least one compensating roller is mounted on one of said two support units.

17. The seat guide as recited in claim 1, wherein each of said two guide rails is attached to a mounting rail, said mounting rail being mountable to the vehicle.

18. The seat guide as recited in claim 1, wherein each of said two guide rails includes at least one latch hole, said latch hole operable to interact with a locking device.

19. A seat guide for positional adjustment of a vehicle seat along an axis of displacement, said seat guide comprising:

a first guide rail positioned substantially parallel to the axis of displacement;

a second guide rail spaced apart from said first guide rail along a lateral axis and positioned substantially parallel to the axis of displacement;

a plurality of support rollers operably associated with and moveable relative to said first guide rail and said second guide rail;

a plurality of lateral guide devices operably associated with and moveable relative to said first guide rail and said second guide rail, at least a portion of said lateral guide devices being moveable about an axis substantially perpendicular to the axis of displacement, wherein each of said plurality of lateral guide devices are spaced apart from the other of said plurality of lateral guide devices along the axis of displacement; and a plurality of compensating rollers operatively associated with and movable relative to said first guide rail and said second guide rail, wherein at least one of said plurality of compensating rollers has an elastic material raceway.

20. The seat guide as recited in claim 19, wherein said plurality of lateral guide devices include a plurality of guide rollers operably associated with and movable relative to said first guide rail and said second guide rail.

21. The seat guide as recited in claim 19, wherein at least one of said plurality of guide rollers is moveably attached to at least one of a plurality of support pieces.

22. A seat guide for positional adjustment of a vehicle seat along an axis of displacement, said seat guide comprising:

a first guide rail positioned substantially parallel to the axis of displacement;

a second guide rail spaced apart from said first guide rail along a lateral axis and positioned substantially parallel to the axis of displacement;

at least one support roller operably associated with and movable relative to said first guide rail and said second guide rail;

at least one lateral guide device having at least one guide roller operably associated with and movable relative to said first guide rail and said second guide rail, at least a portion of said at least one lateral guide device being movable about an axis substantially perpendicular to the axis of displacement;

the at least one guide roller being movably attached to at least one support piece, and the at least one support piece being attached to at least one support unit;

wherein one of said at least one support piece and said at least one support unit is elastically deformable to compensate for lateral dimensional tolerances between said first guide rail and said second guide rail.

23. The seat guide as recited in claim 22, further comprising at least one compensating roller operatively associated with and movable relative to said first guide rail and said second guide rail.

* * * * *

UNITED STATES PATENT AND TRADEMARK OFFICE
CERTIFICATE OF CORRECTION

PATENT NO. : 6,488,250 B1
DATED : December 3, 2002
INVENTOR(S) : Ingo Munch

It is certified that error appears in the above-identified patent and that said Letters Patent is hereby corrected as shown below:

Column 7,
Line 8, delete the word "arid" and replace with the word -- and --.

Signed and Sealed this

Eleventh Day of March, 2003

JAMES E. ROGAN
*Director of the United States Patent and Trademark Office*